Jan. 26, 1960 E. V. RIPPINGILLE 2,922,437
FLUID FLOW CONTROL MEANS
Filed March 16, 1955

INVENTOR
Edward V. Rippingille
BY
L. D. Burch

2,922,437
FLUID FLOW CONTROL MEANS

Edward V. Rippingille, Farmington, Mich., assignor to General Motors Corporation, Detroit, Mich., a corporation of Delaware Application March 16, 1955, Serial No. 494,715

1 Claim. (Cl. 137—525.1)

This invention relates to fluid flow control means generally and more particularly to fluid flow control valves disposed within fluid flow conduits and which are responsive to pressure differentials on opposite sides thereof for controlling the flow of fluid through such conduit.

Fluid flow control valves which have been proposed in the past have included ball check valves, poppet-type valves and flapper valves, all of which comprise valve members and valve seats. Such valves generally are not adaptable for passing a slurrious mass of material which contains rough granular substances since in closing the granular material is trapped between the valve and its seat preventing the valve from completely closing, scarring the valve member and seat, and rendering the valve inoperative. Other check valves have been proposed which include yieldable members stretched across the fluid flow conduit to provide a slit-like opening through which the fluid may pass upon stretching open the yieldable material. Although a valve of this type would seem adaptable for passing a slurrious mass, continuous use results in the stretching and deforming of the valve lips which eventually render the valve inoperative.

It is now proposed to provide fluid flow control means comprising a tricuspid valve formed from a yieldable material and including an outer wall portion having three separate flexible walls or webs forming fluid pockets with the outer wall. The flexible walls are adapted to converge together to close the flow passage through the valve, and consequently the conduit, or to fold against the outer wall to provide an unobstructed passage therethrough. The proposed tricuspid valve is similar to the mitral and aortic valves of the human heart and more particularly like those shown in co-pending applications SN 401,161 "Fluid Pump," filed Dec. 30, 1953, now Patent No. 2,810,347 and SN 411,061 "Heart Pump," filed Feb. 18, 1954, now Patent No. 2,832,294, both in the name of this inventor.

The tricuspid type valve, being a part of the human heart, has long been known; however, no successful tricuspid valves have been proposed to date for acceptable commercial use as a flow control means despite the known durability and long life of such a valve within the heart. Such fact speaks for the unobviousness of the solution and the importance of what might otherwise be considered insignificant details.

The proposed valve means, as adapted for use within a fluid flow conduit to provide fluid flow control means, include means for retaining the outer wall portion of each fluid pocket or cusp member, and particularly both ends thereof, in engagement with the side wall of the conduit.

The extent of fluid flow control is dependent upon the responsiveness of the valve means to the pressure differentials on opposite sides thereof. The fluid pressure acts upon the flexible walls extended within the flow passage to either fold the flexible flaps back upon the outer wall or to hold the lips of the flexible walls in engagement by filling the fluid pockets formed by the flexible walls and outer wall. To provide the desired responsiveness to fluid pressure differences on opposite sides of the valve means, it is necessary to retain the flexible walls in extended relation within the fluid stream and disposed to be acted upon by the fluid. For this reason it is best to retain both ends of the outer wall in engagement with the conduit wall leaving only the flexible walls disposed within the fluid stream. If fluid is permitted to enter between the outer wall of the valve and the conduit wall the fluid pressure effect upon the flexible wall is minimized. To further assure greater responsiveness for the valve means the flexible walls should provide the greatest possible surface area within the fluid stream. In this respect it is best to eliminate any seam or crease within each flexible wall or web or, if a seam or crease is necessary for greater production ease, to provide only such seam or crease as will not divide the forces acting upon the flexible wall surface so as to cause the forces to pinch the valve open.

The present valve means include fastening means for retaining both ends of the valve body in engagement with the conduit wall within which disposed and particularly for retaining the outer wall portion of each fluid pocket or cusp member in such engagement, whether the cusps are integral with the outer shell or each cusp is a separate member. Each cusp is further disposed in extended axial relation within the fluid flow conduit in order to dispose the flexible walls in the best disposition, at all times, to be acted upon by the fluid pressures. Each flexible wall is further formed without a seam or fold, to the greatest extent possible, to provide a greater yieldable surface area allowing the flexible flap to respond to a lesser fluid pressure difference.

Figure 1:
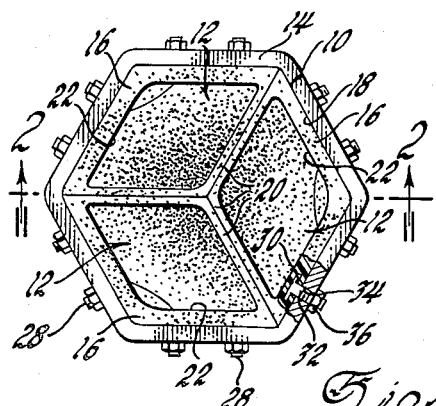
Figure 1 is a top elevation view of the proposed valve means as disposed within a hexagonal valve housing.
Figure 3:
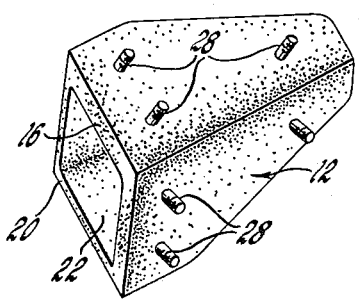
Figure 3 is a perspective view of one of the cusps forming the tricuspid valve means shown in Figure 1.

The fluid flow control means shown in Figure 1 comprise a tricuspid valve 10 which is formed by having three separate extended cusps or flexible pocket members 12 secured within a flow conduit or valve housing member 14. In this particular illustration the valve housing 14 is hexagonal in shape; however, other forms may be used such as the cylindrical shaped casing 14' shown in Figure 4. Each of the three cusps 12 includes an outer wall portion 16 which is adapted to be secured to the inner wall 18 of the flow conduit or valve housing 14 and a flexible wall or web 20 which is extended in spaced relation from the outer wall 16 within the fluid flow conduit. The perspective view of one of the cusps 12 shown by Figure 3 shows the outer wall to be tapered from the top thereof towards the bottom. The flexible wall or web 20 is joined to the outer edge of the outer wall 16 and is similarly tapered. The cross-section of the web 20 is substantially the same as that of the outer wall 16 throughout the length of the cusps 12 thereby enabling the flexible wall 20 to fold upon the outer wall, when opening, without stretching or deforming the flexible wall beyond its elastic limits. The flexible wall 20 is formed, as nearly as possible, without any seam or crease in order to provide the largest and most readily yieldable surface area.

Each cusp is formed to provide a fluid pocket 22 by the disposition of the flexible wall 20 in spaced relation to the outer wall 16. The outermost edge of the flexible wall 20 is formed to provide a substantially vertically disposed lip 24 which is adapted to be engaged with the lips of adjacent flexible walls 20 of the other cusps 12 to close off the conduit from fluid flow.

In operation, if the fluid flow pressure at the open side of the fluid pockets 22 is greater than that on the other side of the valve, the pockets will be filled with fluid and the lips 24 will engage, and be held in engagement by the fluid pressure within the pockets, to prevent the flow of fluid through the valve. If, however, the fluid pressure is greater at the upstream side of the valve, pressure will be applied against the inclined walls 26 of the cusps 12 preceding the lip portions 24 to force the lips out of engagement, empty the pockets 22 of their fluid and allow the flexible walls 20 to fold upon the outer walls 16. The degree of pressure differential will determine the extent to which the valve is open thereby providing a fluid flow valve dependent upon the pressure differential and also one which is responsive to small differences in fluid pressure. However, the valve will open wider if necessary to pass particles of solid matter which may be larger than the opening provided as a result of the pressure differences.

Figure 2:
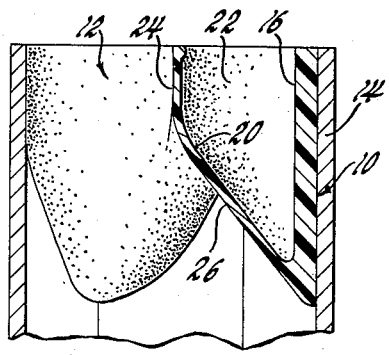
Figure 2 is a cross-sectional view of the valve means shown in Figure 1 taken in the plane of line 2—2 and viewed in the direction of the arrows.
Figure 4:
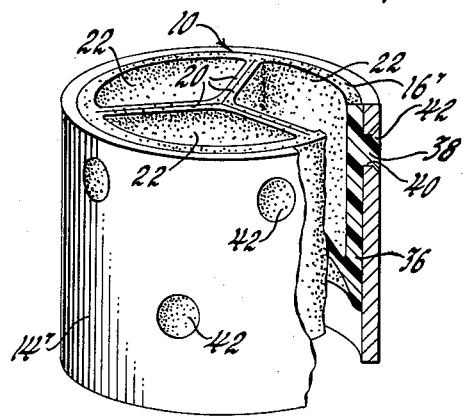
Figure 4 is a perspective view of the tricuspid valve means disposed within a circular conduit or valve housing and having parts broken away and shown in cross-section.

It is necessary that the outer wall of the proposed valve means 10, whether including an annular outer wall 16' having the cusps formed integrally therewith, as shown in Figure 4, or whether including a wall portion 16 formed with each separate cusp member, as shown in Figures 1–3, be secured to the inner surface of the fluid flow conduit or valve housing within which disposed in order that the inclined portion 26 of the flexible wall 20 be disposed in a manner whereby it may be acted upon by the fluid pressure. If the outer walls of the cusps are not retained against the inner surface of the conduit, fluid would be trapped between the outer walls and conduit wall and would hold the lips 24 of the flexible walls in engagement and keep the valve closed similar to having the pockets 22 filled with fluid under pressure.

In Figures 1–3 the outer walls 16 of the fluid pocket members or cusps 12 are secured to the inner surface of conduit 14 by fastening means 28 having the heads 30 thereof imbedded within the side walls of the cusps and the shanks 32 extended through openings 34 provided in the valve housing or conduit 14 with a lock nut 36 threaded thereon. The fastening means 28 are spaced to include retaining means at both ends of the cusps 12 thereby positively retaining the fluid pocket members in extended relation within the flow conduit.

As shown in Figure 4, the outer wall 16' of the valve means may be formed to include studs or button-like projections 38 which may be received through openings 40 provided within the conduit or valve housing 14'. These studs 38 may include a head 42 to prevent withdrawal since other retaining means are not used. It will be noted again that the means proposed for securing the valve means 10 within the housing 14' are adapted to retain each end of the valve means, and particularly the outer annular wall 16' thereof, in engagement with the inner surface of the conduit wall. Inasmuch as the fluid pockets or cusps 12 are tapered at one end, only one stud 42 is actually required, as is shown, to keep the pocket member in the required extended relation within the conduit.

Figure 5:
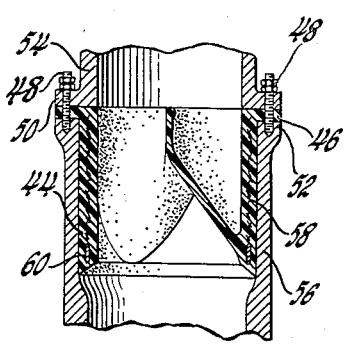
Figure 5 is a cross-sectional view of the proposed valve means showing another way of forming the valve to provide means for securing the valve within a flow conduit.

The proposed valve means may be formed as an insert for flow conduits as shown in Figure 5. In this embodiment the outer wall 44 is formed to include a flange 46 which is received, and secured by fastening means 48, between flanges 50 and 52 of adjacent mating conduit sections 54 and 56 respectively. Such flanges could, of course, be provided at both ends of the valve means, though not so shown here. The conduit sections 54 and 56 are shown to be formed to specifically accommodate the valve means by having the inner surface of the conduit section 54 lie contiguous with the inner surface of wall 44 of the valve means and by having section 56 enlarged slightly to receive the extended portions of the valve means. However, while this makes a better installation, it is not essential. Since flange 46 is provided at only one end of the valve means in the embodiment shown, a textile fabric 58 is imbedded within the outer wall 44 and an annular metal or other ring 60 is provided to retain the other extremity of the outer wall of the valve means against the inner surface of conduit section 56.

Figure 6:
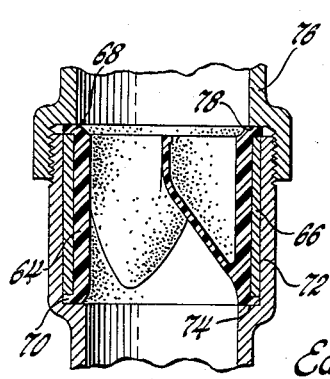
Figure 6 is of still another means of forming the proposed valve means and for securing the valve within a flow conduit.
Figure 7:
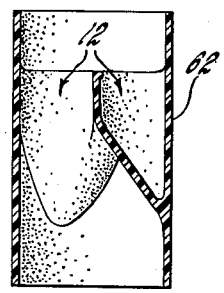
Figure 7 shows a simplified tricuspid valve which may be adaptable for use in replacing valve means within a human heart.

Another means of holding opposite ends of the valve means in engagement with the side walls of a conduit would include extending the outer wall beyond the fluid pocket members or cusps 12 in both directions, as shown in Figure 7 by outer wall 62, and folding these ends over a sleeve member as shown in the co-pending application SN 411,061 "Heart Pump" mentioned previously, and somewhat like in the embodiment shown in Figure 6. The valve shown in Figure 7 may be made of a vinyl polymer and with the extended ends of the outer walls sutured within a blood vessel or portion of the human heart, may serve to replace a damaged aortic or mitral valve. While other artificial heart valves have been proposed, they have not been completely adaptable for such use. It is necessary that adequate means be provided for permanently retaining the proposed artificial valve in operative position. As previously mentioned, this requires that both ends of the extended valve be secured to a supporting structure or wall in order to retain the fluid pockets in proper extended relation.

The valve means of Figure 6 show another adaptable means of securing the opposite ends of the extended valve in place. The outer wall 64 is bonded, though it need not necessarily be, to a sleeve 66 and includes flanges 68 and 70, which may alternatively merely be extremities of wall 64 folded over, extending over the ends of the sleeve. The valve and sleeve are inserted within a receiving conduit section 72 with the one flange 70 engaging seat 74 formed therein. Another conduit section or coupling member 76 is then threaded to the first conduit member 72 and by means of a shoulder 78 formed therein holds the ends of the valve securely between the conduits with the flanges 68 and 70 providing fluid sealing means.

I claim:

Fluid flow control means including valve means of extended length for use within a fluid flow conduit, said valve means comprising fluid pocket members having an outer wall adapted to engage the inner wall surface of said conduit and flexible inner walls disposed in spaced relation to said outer wall, said flexible walls being responsive to fluid pressures at opposite ends of said valve means for engaging together to close said conduit and for folding upon said outer wall for opening said conduit, and threaded fastener means provided between the ends of said pocket members for retaining each end of said outer wall in engagement with said inner wall surface of said conduit for retaining said pockets in extended relation within said conduit, said fastener means including a plurality of members extending transversely outward from said outer wall and through said conduit inner wall surface.

References Cited in the file of this patent

UNITED STATES PATENTS

| Re. 682 | Peale | Apr. 5, 1859 |
| 1,783,281 | Cox | Dec. 2, 1930 |
| 1,800,157 | Saunders | Apr. 7, 1931 |
| 2,456,615 | Berglund | Dec. 21, 1948 |
| 2,576,192 | Poznik | Nov. 27, 1951 |
| 2,598,122 | Hansen | May 27, 1952 |
| 2,682,057 | Lord | June 29, 1954 |
| 2,716,575 | Vickers | Aug. 30, 1955 |
| 2,750,959 | Von Seggern | June 19, 1956 |

FOREIGN PATENTS

| 681,506 | Great Britain | Oct. 22, 1952 |